US012560129B2

(12) United States Patent
Vaccarino

(10) Patent No.: US 12,560,129 B2
(45) Date of Patent: Feb. 24, 2026

(54) TRANSPORT VEHICLE WITH HEAT ENGINE AND METHOD FOR CHARACTERIZING ACOUSTIC EMISSIONS OF SAID VEHICLE

(71) Applicant: PIAGGIO & C. S.P.A., Pontedera (IT)

(72) Inventor: Pietro Vaccarino, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 0 days.

(21) Appl. No.: 18/730,882

(22) PCT Filed: Jan. 19, 2023

(86) PCT No.: PCT/IB2023/050458
§ 371 (c)(1),
(2) Date: Jul. 22, 2024

(87) PCT Pub. No.: WO2023/148570
PCT Pub. Date: Aug. 10, 2023

(65) Prior Publication Data
US 2025/0101927 A1 Mar. 27, 2025

(30) Foreign Application Priority Data
Feb. 22, 2022 (IT) ........................ 102022000001784

(51) Int. Cl.
*G06G 7/70* (2006.01)
*B62J 50/22* (2020.01)
*F02D 41/02* (2006.01)

(52) U.S. Cl.
CPC ............ *F02D 41/021* (2013.01); *B62J 50/22* (2020.02); *F02D 2200/025* (2013.01);
(Continued)

(58) Field of Classification Search
CPC .. G01S 13/931; G01S 2013/932; G01S 7/497; B60W 10/06; B60W 10/08; B60W 20/17; F02D 2200/025; G10K 2210/1282
(Continued)

(56) References Cited

U.S. PATENT DOCUMENTS 10,223,842 B1 * 3/2019 Lee ........................... G01H 3/00
11,142,206 B2 * 10/2021 Tabata ................... B60W 10/10
(Continued)

FOREIGN PATENT DOCUMENTS

EP 1575163 A2 * 9/2005 ............... H03G 3/32
EP 1688707 A1 8/2006
JP 2006069487 A 3/2006

OTHER PUBLICATIONS

International Search Report for corresponding application PCT/IB2023/050458 filed Jan. 19, 2023; Mail date May 4, 2023.
(Continued)

*Primary Examiner* — Hung Q Nguyen
*Assistant Examiner* — James J Kim
(74) *Attorney, Agent, or Firm* — CANTOR COLBURN LLP

(57) ABSTRACT

A transport vehicle (1) comprising: —a heat engine (8) operable at a number of revolutions varying between a minimum number and a maximum number; —an adjusting device (52) configured to adjust an infeed flow of air-fuel mixture to the heat engine (8); —at least one on-board memory unit (61) in which an acoustic emission map (70) of the transport vehicle (1) is stored, wherein for each data pair comprising a first data item correlated to an operating condition of the adjusting device (52) and a second data item correlated to the number of engine revolutions, the acoustic emission map (70) associates, as a function of the first data item and as a function of the second data item, a third data
(Continued)

item correlated to an acoustic emission measurement by at least one acoustic sensor (S1) external to the transport vehicle (1) and arranged at a separation distance from the transport vehicle (1).

15 Claims, 3 Drawing Sheets

(52) U.S. Cl.
CPC ................ *F02D 2200/0404* (2013.01); *F02D 2200/101* (2013.01); *F02D 2200/701* (2013.01)

(58) Field of Classification Search
USPC .......................................................... 701/102
See application file for complete search history.

(56) References Cited

U.S. PATENT DOCUMENTS

| | | | |
|---|---|---|---|
| 11,521,435 B2 * | 12/2022 | Jung | G05B 23/0281 |
| 11,594,142 B1 * | 2/2023 | Cleckler | G08G 5/53 |
| 2014/0093087 A1 * | 4/2014 | Kikuchi | H03G 3/32 |
| | | | 381/86 |
| 2017/0222612 A1 * | 8/2017 | Zollner | H04R 3/12 |
| 2023/0068919 A1 * | 3/2023 | Shelby | F02D 31/003 |
| 2023/0313748 A1 * | 10/2023 | Salter | B60L 53/68 |
| | | | 701/102 |

OTHER PUBLICATIONS

Written Opinion for corresponding application PCT/IB2023/050458 filed Jan. 19, 2023; Mail date May 4, 2023.

* cited by examiner

TRANSPORT VEHICLE WITH HEAT ENGINE AND METHOD FOR CHARACTERIZING ACOUSTIC EMISSIONS OF SAID VEHICLE

TECHNICAL FIELD

The present disclosure relates to the technical field of transport vehicles, and is particularly directed to a transport vehicle with heat engine and a method for characterizing acoustic emissions of said transport vehicle.

BACKGROUND

As is known, transport vehicles with heat engine produce acoustic emissions during their use. Such acoustic emissions are mainly due to acoustic emissions produced by the exhaust system of the heat engine. Especially in urban areas or at given times of the day, these acoustic emissions are a source of nuisance or generally contribute to a significant increase in noise pollution.

Noise pollution can cause harm to people's health. Indeed, noise pollution causes sleep disorders, cognitive problems in children, and adverse effects on the cardiovascular and metabolic systems. In general, noise pollution also causes damage to nature, inducing behaviors in animals which can jeopardize their survival.

Although the World Health Organization has promoted the implementation of measures to reduce noise pollution for some time, there has been no significant decrease in noise pollution in recent years.

Moreover, although government agencies have imposed approval requirements in terms of acoustic emissions for heat engine vehicles, it has been noted that these requirements are still too mild and the limits included therein are not sufficient to reduce noise pollution to levels that are less harmful to health and the environment.

Moreover, the acoustic emissions of a transport vehicle with heat engine are also strongly affected by the driving behavior of the vehicle driver but to date, there is no valid instrument that imposes, induces, or suggests modifications of the driving behavior in order to reduce acoustic emissions.

The present description provides a transport vehicle with heat engine, which can contribute to reducing environmental and/or urban noise pollution.

The present description further provides a method for characterizing acoustic emissions of a transport vehicle with heat engine.

The disclosure will be better understood from the following detailed description of particular embodiments thereof, given by way of example and thus not limiting in any manner, with reference to the accompanying drawings briefly described below. In such drawings, the same or similar elements are identified by the same reference signs. It should be noted that some elements in such drawings cannot be arranged or shown to scale with respect to other elements.

DETAILED DESCRIPTION

Figure 1:
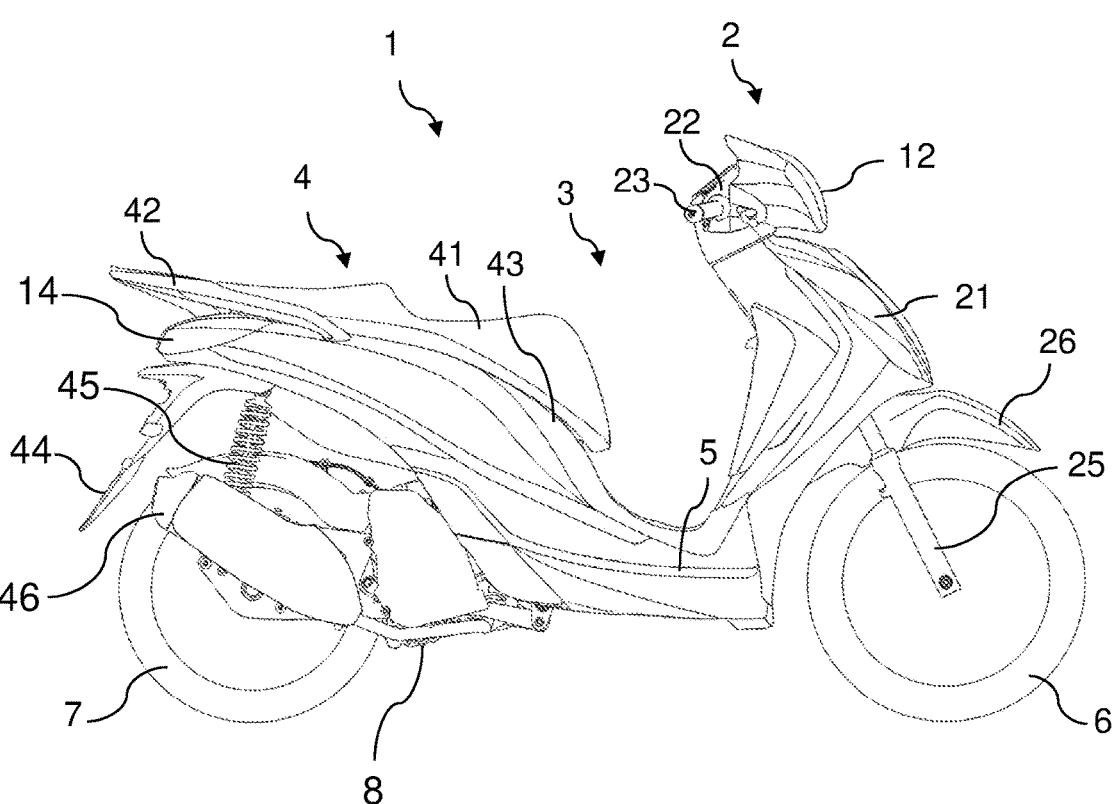
FIG. 1 shows a side plan view of a non-limiting exemplary embodiment of a transport vehicle comprising a heat engine.
Figure 2:
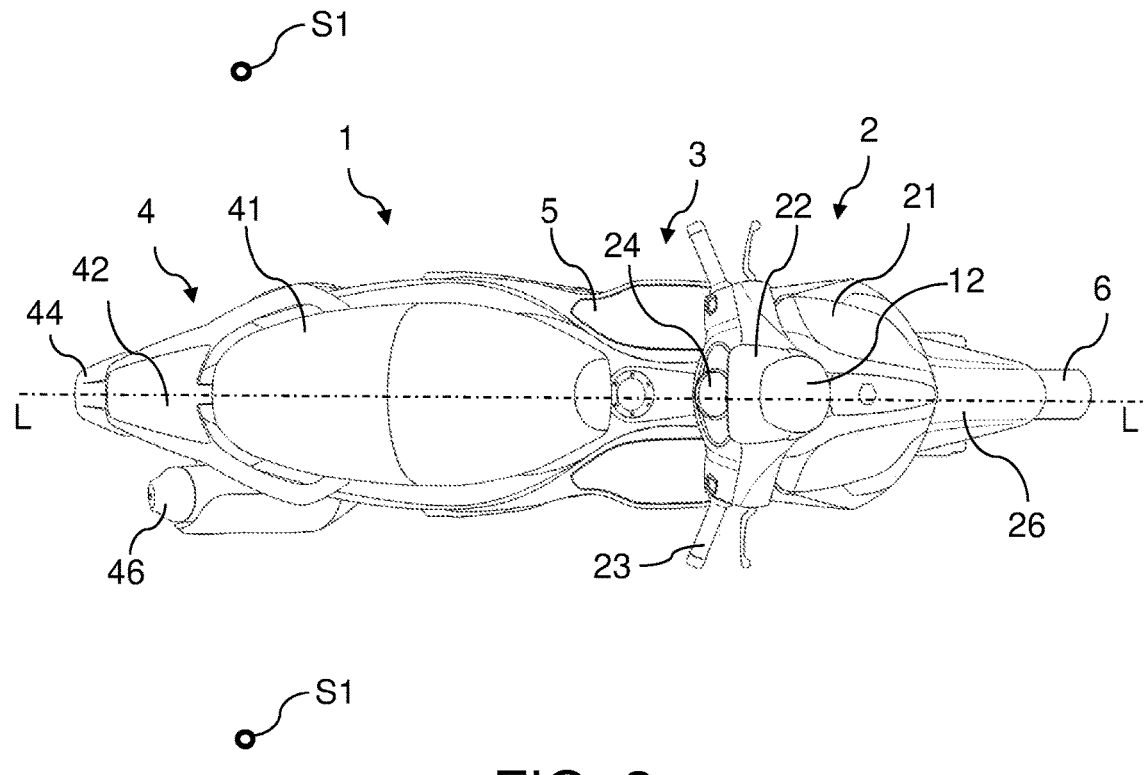
FIG. 2 shows a plan view of the transport vehicle in FIG. 1.

The accompanying FIGS. 1 and 2 show an embodiment of a transport vehicle 1 with heat engine, which in the particular example shown is a rideable-saddle vehicle 1, without introducing any limitation for this reason.

The rideable-saddle vehicle 1 in the example shown in FIGS. 1 and 2 is a two-wheel motorcycle, and in particular a two-wheel scooter, having a front wheel 6 and a rear wheel 7. In an alternative embodiment, the transport vehicle 1 with heat engine could be a motorized tricycle, a motorized quadricycle, a car, a bus, a truck, a lorry, a work vehicle, etc.

Hereafter in the present description of detailed examples of the disclosure, reference will be made, without introducing any limitation to the transport vehicle for this reason, to a motorcycle 1, i.e., to a rideable-saddle transport vehicle, comprising:

a main body 2, 3, 4;

at least two wheels 6, 7 constrained to the main body 2, 3, 4;

a heat engine 8, e.g., a heat traction engine, constrained to the main body 2,3,4 and operatively connected, either directly or indirectly, to at least one of the two wheels 6,7.

It is worth noting that for the purposes of the present description and claims, the terms "transport vehicle," "vehicle," and "motorcycle" are totally mutually interchangeable.

The main body 2, 3, 4 of the motorcycle 1 extends along a longitudinal axis L-L parallel to the travel axis of the motorcycle 1. In the example, the main body 2, 3, 4 has a front part 2, a tail part 4, and a central part 3 interposed between the front part 2 and the tail part 4. For example, the central part 3 comprises a footboard 5.

Conveniently, the motorcycle 1, and in particular the tail portion 4, comprises a saddle 41 and a supporting portion 43 of the saddle 41, and the footboard 5 connects the supporting portion 43 of the saddle 41 to the front portion 2 of the main body 2, 3, 4 of the motorcycle 1.

In the example, the front part 2 of the main body 2, 3, 4 comprises a front shield 21, a steering handlebar 22, the front wheel 6, a front mudguard 26, and a front suspension 25. The front part 2 preferably comprises a control dashboard 24, e.g., integrated into the steering handlebar 22. The steering handlebar 22 preferably comprises a throttle grip 23.

In the example, the rear part 4 of the main body 2, 3, 4 comprises a luggage rack 42, a rear suspension 45, the rear wheel 7, the heat engine 8, a rear mudguard 44, and an exhaust pipe 46.

The motorcycle 1 comprises at least one headlight 12 fixed to the front part 2 and at least one rear light 14 fixed to the tail part 4. In a situation in which the steering handlebar 22 is not turned, i.e., in the condition in which the front wheel 6 and the rear wheel 7 are aligned along the longitudinal axis L-L, the headlight 12 is such to emit a light beam mainly directed along the longitudinal axis L-L to illuminate a portion of ground located in front of the motorcycle 1. The rear light 14 is preferably such that it emits a diffuse, i.e., non-directional, optical radiation.

Figure 3:
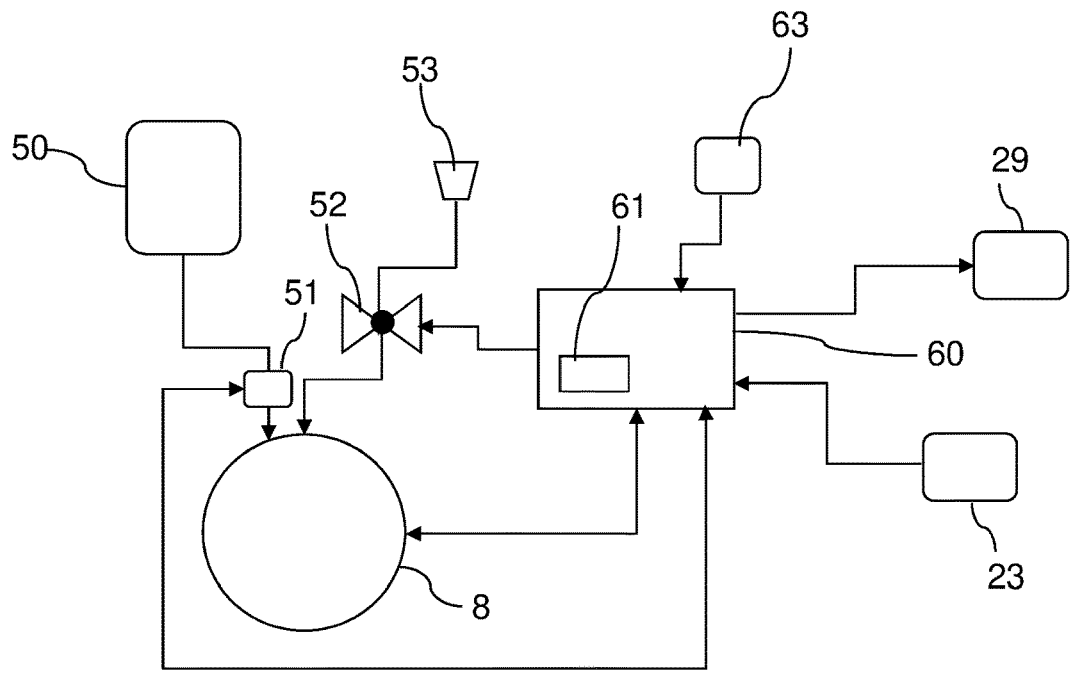
FIG. 3 shows a simplified functional block chart of the control of the heat engine of the transport vehicle in FIG. 1.

Referring to FIG. 3, the motorcycle 1 further comprises a fuel tank 50 adapted to contain fuel to be supplied to the heat engine 8. The control diagram shown in FIG. 3 refers to the particular case in which the heat engine 8 is a gasoline engine. However, it should be noted that those skilled know how to modify the diagram in FIG. 3 if the heat engine 8 is a diesel engine or a heat engine to be supplied with a different fuel.

The motorcycle 1 comprises an engine control unit 60 or ECU adapted to control the heat engine 8 so that it is operable between a minimum number of revolutions and a maximum number of revolutions. In particular, the engine control unit 60 controls the air-fuel mixture supplied to the heat engine 8 based on a torque request either received or calculated by the engine control unit 60 and based on signals provided by various sensors known to those skilled in the art. For example, the torque request is sent by the driver of the motorcycle 1 by means of the throttle grip 23, or in general by means of any acceleration control device 23. For example, in a passenger car, the acceleration control device 23 generally is an acceleration pedal. The engine control unit 60 comprises hardware and software components allowing said engine control unit 60 to carry out the operations required.

The throttle grip 23, or in general the acceleration control device 23, is preferably operatively connected to the engine control unit 60 to provide the engine control unit 60 with an electrical torque request signal. In other words, the acceleration control device is a drive-by-wire control device. In an alternative embodiment, the acceleration control device 23 is a traditional control device with mechanical wire. Again, those skilled in the art will know how to modify the diagram in FIG. 3 to adapt it to this alternative embodiment.

The motorcycle 1 comprises at least one adjusting device 52 configured to adjust an infeed flow of air-fuel mixture to the heat engine 8. The adjusting device 52 is preferably operatively connected to the engine control unit 60 for being controlled by the latter. For example, the adjusting device 52 allows controlling the air flow fed into heat engine 8 and, therefore, also allows adjusting the supply flow of the air-fuel mixture fed into heat engine 8. For example, the adjusting device 52 either is or comprises a butterfly valve.

In the particular diagram shown in FIG. 3, which as already explained refers to the case of controlling a gasoline heat engine, the adjusting device 52 allows adjusting an air flow supplied to the heat engine 8 from an intake nozzle 53 of the motorcycle 1, e.g., placed downstream of an air filter (not shown in the figures).

Again in the particular non-limiting example shown in FIG. 3, the motorcycle 1 comprises at least one fuel injection device 51, e.g., at least one electronic fuel injector 51, operatively connected to the heat engine 8 and the fuel tank 50 to adjust the fuel flow supplied to the heat engine 8. Preferably, the injection device 51 is operatively connected to the engine control unit 60 to be controlled by the latter.

The adjusting device 52 is configured to take a plurality of operating conditions to adjust the air-fuel mixture supply flow to the heat engine 8. In particular, said operating conditions are taken by the adjusting device 52 due to the control operated by the engine control unit 60 or more in general due to the control operated by means of the acceleration control device 23. For example, if the adjusting device 52 comprises a butterfly valve, each of said plurality of operating conditions corresponds to a different opening degree of the butterfly valve. As known, the opening degree of a butterfly valve can be precisely adjusted by an electronically controllable actuator, such as an electric motor comprised in the butterfly valve, for example.

The motorcycle 1 also comprises at least one on-board memory unit 61 in which an acoustic emission map 70 of the motorcycle 1 either is or can be stored. For each data pair comprising a first data item correlated to an operating condition of the adjusting device 52 and a second data item correlated to the number of engine revolutions, the acoustic emission map 70 associates a third data item correlated to an acoustic emission measurement of the motorcycle 1. These acoustic emissions of the motorcycle 1 are measured in advance by an acoustic sensor S1 external to the transport vehicle and arranged at a predetermined separation distance from the transport vehicle. Thereby, the measured acoustic emissions are not those perceived by the driver or passenger of the transport vehicle, but rather those perceived by a fictitious third party who is at the predetermined distance from the vehicle 1 when the vehicle is transiting under given conditions of number of engine revolutions and control of the adjusting device 52. Thus, the acoustic emissions associated with the third data item are those perceived by a third party other than that on the vehicle 1. The noise indication of the vehicle 1 is thus more objective and truer than a third-party detection point.

Figure 4:
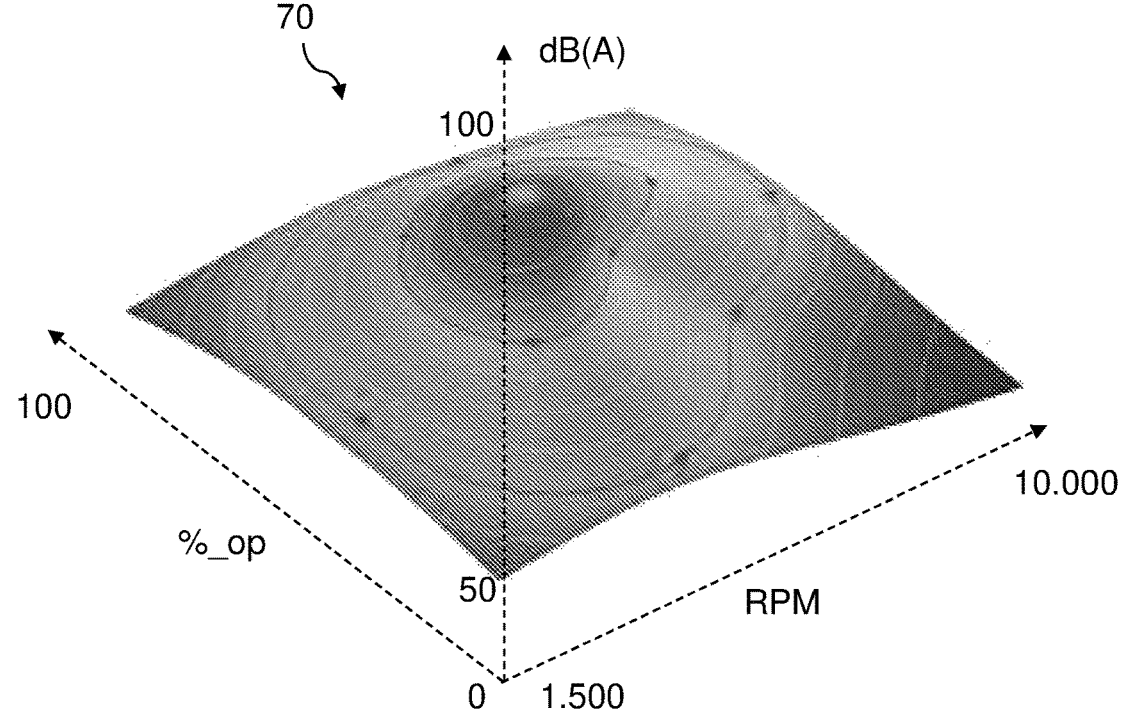
FIG. 4 shows the graph of an example of an acoustic emission map to be stored in a memory unit provided on board the transport vehicle with heat engine.

A non-limiting example of acoustic emission map 70 is shown in FIG. 4, in which a three-dimensional map is illustrated, in which:

the first data item %_op represents the rotation degree of the throttle grip 23 expressed as a percentage, and it is assumed, merely by way of example, that the rotation degree could vary between 0% (engine idling) and 100%;

the second data item RPM is the number of revolutions of the heat engine 8 and it is assumed, merely by way of example, that the number of revolutions could vary between a minimum number of revolutions of 1,500 RPM and a maximum number of revolutions of 10,000 RPM; and the third data item is an acoustic emission measurement expressed in dB (A), and it is assumed, merely by way of example, that this measurement could vary between 0 dB (A) and 100 dB (A).

In other words, the aforesaid three-dimensional map 70 can be managed by a function of data look-up table, e.g. of digital data, which allows determining, preferably in real time, an acoustic emission value, measured a priori, to be associated with each coordinate pair formed by the first data item and the second data item.

It is also apparent that the rotation degree of the throttle grip 23 mentioned with reference to the map 70 in FIG. 4 and detectable, for example, by an encoder, is a possible first data item correlated to the operating condition of the adjusting device 52, e.g., correlated to the opening degree of the butterfly valve. However, it should be noted that this is not the only possibility because there can be other data on-board a motor vehicle 1 which are correlated to the operating condition of the adjusting device 52, for example obtainable by a sensor integrated in the adjusting device 52 or from the control signal provided by the engine control unit to the adjusting device 52.

Conveniently, the on-board memory unit 61 of the motorcycle 1 is a non-volatile computer memory. In the non-limiting example of the diagram in FIG. 3, the on-board memory unit 61 is shown integrated into the engine control unit 60. In an alternative embodiment, the on-board memory unit 61 could be a memory unit outside the engine control unit 60 and be operatively connected thereto. For example, the on-board memory unit 61 could be integrated into or connected to an electronic processing unit outside the engine control unit 60 and operatively connected thereto.

According to an advantageous embodiment, the motorcycle 1 comprises an electronic processing unit configured to detect in real time the operating condition of the adjusting device 52 and the number of engine revolutions while the motorcycle 1 is being driven, and to access the on-board memory unit 61 to obtain in real time the aforesaid third data item correlated to the corresponding acoustic emission measurement. The aforementioned electronic processing unit can be the same engine control unit 60 or a separate and/or distinct unit. In the present description, from now on reference will be made to the case in which the electronic processing unit is the same as the engine control unit 60, and for this reason, it will be referred to as the electronic processing unit 60 as well as the engine control unit 60. As mentioned above, one or more sensors either integrated into or connected to the adjusting device 52 can be used to detect the operating condition of the adjusting device 52. Alternatively, the operating condition of the adjusting device 52 can be determined based on a control signal provided by the engine control unit 60 and/or based on the operating state of the acceleration control device 23. One or more sensors integrated into, or operatively connected to, the heat engine 8 can be used to detect the number of engine revolutions. In any case, this data item is generally already available to an engine control unit 60.

According to an advantageous embodiment, the electronic processing unit 60 is configured to produce an electronic control signal based on the third data item obtained.

For example, the electronic control signal is provided by the electronic processing unit 60 to a human-machine interface device 29 or HMI 29, preferably to a graphical and/or acoustic and/or tactile interface device. The aforesaid human-machine interface device 29 is, for example, a graphic display or optical indicator, conveniently integrated into the control dashboard 24 of the motorcycle 1. Either additionally or alternatively, the human-machine interface device 29 is a wearable device, such as a protective helmet, for example, or a personal communication device, such as a smartphone or smartwatch operatively connectable to the electronic processing unit 60, for example.

If the human-machine interface device comprises a graphical interface device, for example, said graphical interface can dynamically display a colored bar to the driver, e.g.:

green when the acoustic emissions obtained from the map 70 are lower than 75 dB (A);

amber when the acoustic emissions obtained from the map 70 are in the range of 75-82 dB (A);

red when the acoustic emissions obtained from the map 70 are higher than 82 dB (A).

According to an alternative embodiment or in addition to that described in the previous paragraph, the electronic control signal allows the electronic processing unit 60 to modify the operating condition of the adjusting device 52 and/or the number of revolutions and/or the operating state of the heat engine 8. Thereby, it is possible to adjust the acoustic emissions of the motorcycle 1 automatically and in real time so that they comply with regulatory or ethical requirements which impose or suggest maximum limits on such acoustic emissions.

Conveniently, the aforesaid automatic adjustment can also be performed based on time data in which the motorcycle 1 is used, such as day/date and time and/or based on location data indicative of the real-time geographic location in which the motorcycle 1 is used. For example, the time data can already be available per se in the electronic control unit 60 or provided to the latter by one or more external devices operatively connected thereto, such as wearable devices and/or personal communication devices and/or sensors, e.g. dusk sensors, for example. The location data indicative of the real-time geographic position can be provided by a satellite tracking module 63 integrated into, or operatively connected to, the electronic processing unit 60. For example, the satellite tracking module 63 is integrated into, or fixed to, the motorcycle 1 or is integrated into a wearable device or personal communication device operatively connectable with the engine control unit 60.

If an option for automatic adjustment is provided, it is convenient to provide the possibility that said automatic adjustment can be selectively activated and deactivated, e.g. by the driver.

Again, if an automatic adjustment possibility is provided, it is particularly advantageous to provide that, before performing said automatic adjustment, an early warning signal is sent, for example from the electronic control unit 60 to the driver of the transport vehicle 1, for example by means of the human-machine interface 29 described above. Conveniently, it is possible that the automatic adjustment is performed after a programmed or programmable period of time has elapsed after the early warning signal is sent, e.g., after a period of time of 5 s or 10 s.

Figure 5:
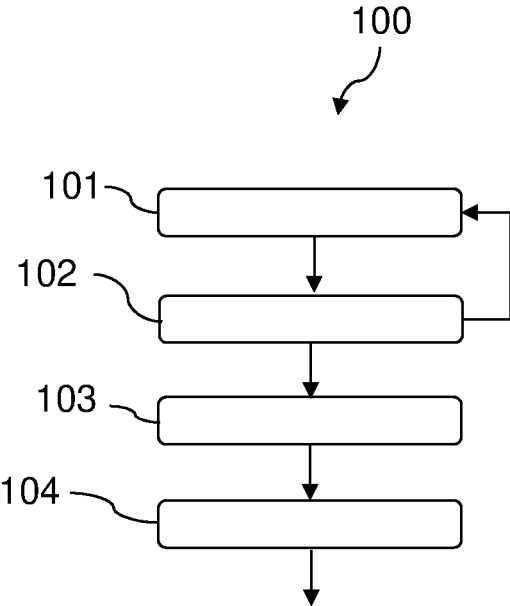
FIG. 5 shows a simplified flow chart of a method for characterizing acoustic emission of a transport vehicle with heat engine.

Referring now to FIG. 5, a method 100 for characterizing the acoustic emissions produced by a transport vehicle 1, also referred to as the characterization method 100, will be described below. As described above, the transport vehicle 1 comprises a heat engine 8 operable at a number of revolutions varying between a minimum number and a maximum number, and an adjusting device 52 configured to adjust an infeed flow of air-fuel mixture to the heat engine 8.

The characterization method 100 comprises the steps of:

a) acquiring 101 an acoustic emission measurement of the transport vehicle 1 as a function of a first data item correlated to an operating condition of the adjusting device 52 and a second data item correlated to the number of engine revolutions, the first data item and the second data item forming a data pair;

b) storing 102, for said data pair, a respective third data item correlated to the respective acoustic emission measurement acquired in a memory unit.

In the characterization method 100, the aforesaid steps a) and b) are repeated for a plurality of first and second data pairs to obtain an acoustic emission map 70 of the transport vehicle 1. The plurality of pairs can comprise a small or large number of pairs, as desired. Said number can be, for example, a few dozen or a few hundred or even of the order of a thousand.

As described above, according to a non-limiting embodiment, the adjusting device 52 either is or comprises a butterfly valve and the operating condition of the adjusting device 52 is an opening degree of the butterfly valve.

According to an advantageous embodiment, the step of acquiring 101 the acoustic emission measurement is performed by at least one acoustic sensor S1, preferably a microphone, external to the transport vehicle 1 and arranged at a separation distance from the transport vehicle 1, conveniently in a stationary position. Preferably, the separation distance is between 5 and 10 meters and is preferably equal to 7.5 meters, as provided by the noise standard UNECE R41.04.

According to a particularly advantageous embodiment, said at least one acoustic sensor S1 comprises a pair of acoustic sensors, e.g. a pair of microphones, mutually arranged on opposite sides with respect to a longitudinal axis L-L of the transport vehicle 1. Conveniently, said microphones are directional microphones.

In the characterization method 100 according to an embodiment, the step of acquiring 101 the acoustic emission measurement comprises the sub-steps of:

a.1) making the transport 1 transit at a predetermined number of revolutions of the heat engine 8 and under a predetermined operating condition of the adjusting device 52 in front of the at least one acoustic sensor S1 to acquire said acoustic emission measurement of the transport vehicle 1;

a.2) repeating step a.1) for a plurality of values of said operating condition of the adjusting device 52 maintaining the predetermined number of engine revolutions constant;

a.3) repeating steps a.1) and a.2) for a plurality of discrete values between said minimum value and said maximum value of said number of engine revolutions.

The pitch of the aforesaid discrete values can be as small or as large as desired, e.g., equal to fifty, or one hundred, or two hundred, or five hundred RPM. Moreover, the aforesaid pitch can be either constant or variable. In the latter case, for example, for relatively lower number of engine revolutions, the pitch can be broader and thus coarser, while for relatively higher number of engine revolutions, the pitch can be narrower and thus finer.

According to an advantageous embodiment, the characterization method 100 comprises a step of interpolating 103 said third data correlated to the acoustic emission measurement to obtain the map 70 as a continuous surface adapted to provide, for each first data item correlated to an operating condition of the adjusting device 52 and for each second data item correlated to the number of engine revolutions, said third data item correlated to the acoustic emission measurement.

Conveniently, the characterization method 100 comprises a step of storing 104 the acoustic emission map 70 in an on-board memory unit 61 of the transport vehicle 1. Such an on-board memory 61 is preferably a non-volatile memory unit.

The acoustic emission map 70 obtained by the characterization method 100 described above can be advantageously used in real time when using a transport vehicle 1 comprising at least one on-board memory unit 61 in which the aforesaid acoustic emission map 70 is stored. For example, said map 70 can be used in a method for monitoring acoustic emissions produced by the transport vehicle 1, which comprises the steps of:

when using the transport vehicle 1, by means of a processing unit 60 arranged on board the transport vehicle 1 and operatively connected to the on-board memory unit 61, detecting the operating condition of the adjusting device 52 and the number of engine revolutions, and obtaining respective third data correlated to the acoustic emissions emitted by the transport vehicle 1 preferably in real time from the stored map 70;

producing at least one electronic control signal as a function of said third data.

According to an advantageous embodiment of the monitoring method, the step of producing the at least one electronic control signal comprises a step of correlating in real time said third data to temporal data, such as date or time, and/or to geo-referencing data of the transport vehicle 1, such as satellite tracking data.

Further features of the characterization method 100 or of the monitoring method described above can be immediately inferred from the above explanation given in the description of transport vehicle 1 made with reference to FIGS. 1-4, whereby such a description complements the description of the aforesaid methods.

Based on the foregoing explanation, it is thus possible to understand how a transport vehicle, a characterization method, and a monitoring method as described above allow fully achieving the intended purposes.

The above disclosure shows and describes but is not intended to be exhaustive or limit the implementations to the precise embodiment disclosed. Changes and variations can be made in light of the above disclosure or can be acquired from the practice of the implementations.

Although reference is generally made in this description to an adjusting device 52, in particular an adjusting device 52 capable of adjusting the air-fuel mixture by adjusting the air flow supplied to the heat engine 8, it is apparent that in alternative or additional embodiments the adjusting device 52 can also be or comprise an adjusting device 52 allowing the amount of fuel supplied to the heat engine 8 to be adjusted, and thus be or comprise an injector or an adjusting device of a different type. Moreover, having described a transport vehicle 1 with heat engine 8 also includes embodiments in which transport vehicle 1 in addition to a heat engine 8 comprises a further motor of a different type, such as an electric motor.

Some human-machine interfaces, i.e., user interfaces, have been described herein. A user interface can include a graphical user interface, a non-graphical user interface, a text-based user interface, and/or the like. A user interface can provide information for display. In some embodiments, a user can interact with information, e.g., by providing inputs through an input component of a device which provides the user interface for display. In some implementations, a user interface can be configurable by a device and/or a user (e.g., a user can change the size of the user interface, the information provided by means of the user interface, a location of the information provided by means of the user interface, etc.). Additionally or alternatively, a user interface can be preconfigured to a standard configuration, a specific configuration based on a type of device on which the user interface is displayed, and/or a set of configurations based on the capabilities and/or specifications associated with a device on which the user interface is displayed.

It will become apparent that the transport vehicle and methods described herein can be implemented in different forms of hardware and software and/or firmware.

Although particular feature claims are provided in the claims and/or disclosed in the description, these combinations are not intended to limit the description of various implementations. Indeed, many of these features can be combined in manners not specifically stated in the claims and/or disclosed in the description. Although each dependent claim listed below can depend directly on a single claim, the disclosure of various implementations includes each dependent claim in combination with every other claim in the claim set.

No element, action, or instruction used herein should be construed as critical or essential unless explicitly described as such. Moreover, as used herein, the indefinite article "a/an" is meant to include one or more items and can be used interchangeably with "one or more". Moreover, as used herein, the definite article "the" is meant to include one or more items referred to in connection with the definite article "the" and can be used interchangeably with "the one or more". Where only one element is provided, the expression "only one" or a similar language is used. Moreover, as used herein, the terms "has", "have", "having" or the like are intended as open-ended terms. Moreover, the expression "based on" means "based, at least partially, on" unless otherwise specified. Moreover, as used herein, the term "or" is meant to be inclusive when used in a series and can be used interchangeably with "and/or" unless otherwise explicitly stated (e.g., when used in combination with "one" or "just one of").

Without prejudice to the principle of the disclosure, the embodiments and the constructional details may be broadly varied with respect to the above description merely disclosed by way of a non-limiting example, without departing from the scope of the disclosure as defined in the appended claims.

The invention claimed is:

1. A motorcycle comprising:
a heat engine operable at a number of revolutions varying between a minimum number and a maximum number;
an adjusting device configured to adjust an infeed flow of air-fuel mixture to the heat engine;
at least one on-board memory unit in which an acoustic emission map of the motorcycle is stored, wherein for each data pair comprising a first data item correlated to an operating condition of the adjusting device and a second data item correlated to the number of engine revolutions, the acoustic emission map associates, as a function of the first data item and as a function of the second data item, a third data item correlated to an acoustic emission measurement; wherein each acoustic emission measurement is acquired by at least one stationary acoustic sensor external to the motorcycle when the motorcycle transits at a separation distance from the at least one acoustic sensor at a predetermined number of revolutions of the heat engine and under a predetermined operating condition of the adjusting device.

2. A motorcycle according to claim 1, comprising an electronic processing unit configured to detect the operating condition of the adjusting device and the number of engine revolutions in real time while driving the motorcycle, and to access the on-board memory unit to obtain in real time said third data item correlated to the corresponding acoustic emission measurement.

3. A motorcycle according to claim 2, wherein the electronic processing unit is configured to produce an electronic control signal based on the obtained third data item.

4. A motorcycle according to claim 3, wherein the electronic control signal is provided by the electronic processing unit to a human-machine interface device, preferably to a graphical and/or acoustic and/or tactile interface device.

5. A motorcycle according to claim 3, wherein the electronic control signal allows the electronic processing unit to modify the operating condition of the adjusting device and/or the number of engine revolutions and/or a state of the heat engine.

6. A motorcycle according to claim 1, wherein the motorcycle is a rideable-saddle vehicle.

7. A method for characterizing acoustic emissions produced by a motorcycle comprising a heat engine operable at a number of engine revolutions varying between a minimum number and a maximum number, and an adjusting device configured to adjust an infeed flow of air-fuel mixture to the heat engine, wherein the method comprises the steps of:
a) acquiring, through at least one stationary acoustic sensor external to the motorcycle, an acoustic emission measurement when the motorcycle transits at a separation distance from the at least one acoustic sensor, at a predetermined number of revolutions of the heat engine and under a predetermined operating condition of the adjusting device;
b) storing, for the data pair, a respective third data item correlated to the respective acoustic emission measurement acquired in a memory unit of the motorcycle;
wherein steps a) and b) are repeated for a plurality of first and second data pairs to obtain an acoustic emission map of the motorcycle.

8. A method according to claim 7, wherein the separation distance is between 5 and 10 meters.

9. A method according to claim 7, wherein said at least one acoustic sensor comprises a pair of acoustic sensors mutually arranged on opposite sides with respect to a longitudinal axis of the motorcycle.

10. A method according to claim 7, wherein the step of acquiring the acoustic emission measurement comprises the sub-steps of:
a.1) making the motorcycle transit at a predetermined number of revolutions of the heat engine and under a predetermined operating condition of the adjusting device in front of the acoustic sensor to acquire said acoustic emission measurement of the motorcycle;
a.2) repeating step a.1) for a plurality of values of said operating condition of the adjusting device maintaining the predetermined number of engine revolutions constant;
a.3) repeating steps a.1) and a.2) for a plurality of discrete values between said minimum value and said maximum value of said number of engine revolutions.

11. A method according to claim 7, wherein the adjusting device either is or comprises a butterfly valve, and wherein the operating condition of the adjusting device is an opening degree of the butterfly valve.

12. A method according to claim 7, comprising a step of interpolating said third data correlated to the acoustic emission measurement to obtain said map as a continuous curve adapted to provide, for each first data item correlated to an operating condition of the adjusting device and for each second data item correlated to the number of engine revolutions, said third data item correlated to the acoustic emission measurement.

13. A method according to claim 7, further comprising a step of storing said acoustic emission map in an on-board memory unit of said motorcycle.

14. A method for monitoring the acoustic emissions produced by a motorcycle with heat engine in real time, wherein the motorcycle comprises at least one on-board memory unit in which there is stored an acoustic emissions map obtained according to a method according to claim 7, wherein the monitoring method comprises the steps of:
when using the motorcycle, by means of a processing unit arranged on board the motorcycle and operatively connected to the on-board memory unit, detecting the operating condition of the adjusting device and the number of engine revolutions, and obtaining in real time respective third data correlated to the emitted acoustic emissions from the stored map;
producing at least one electronic control signal as a function of said third data.

15. A monitoring method according to claim 14, wherein the step of producing the at least one electronic control signal comprises a step of correlating in real time said third data to temporal data, comprising date or time, and/or to geo-referencing data of the motorcycle including satellite tracking data.

\* \* \* \* \*